Patented Sept. 3, 1929.

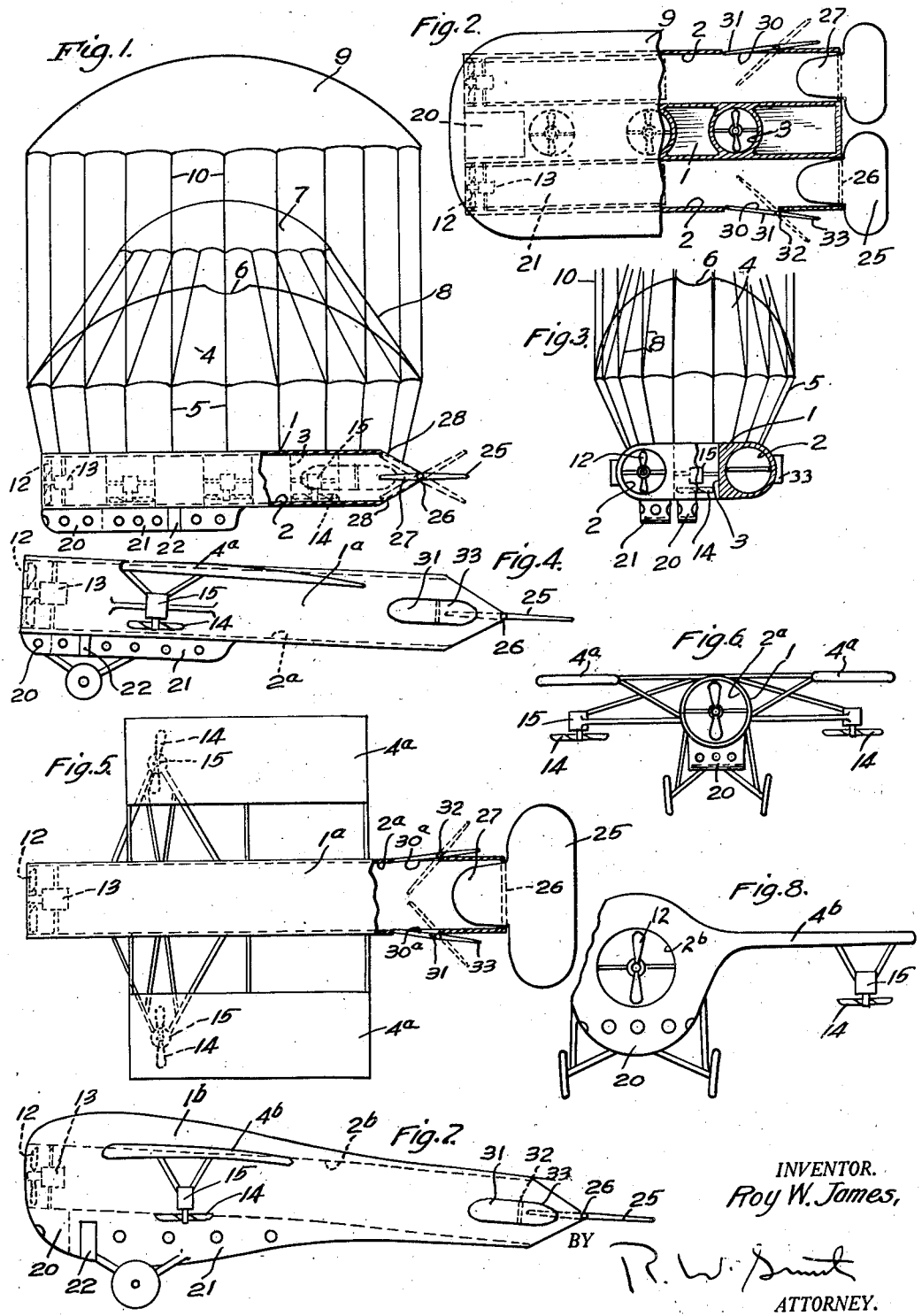

1,727,033

UNITED STATES PATENT OFFICE.

ROY W. JAMES, OF COVINA, CALIFORNIA.

AIRCRAFT.

Application filed February 8, 1928. Serial No. 252,727.

This invention is particularly applicable to aircraft of the heavier than air type but may be embodied in any craft which is sustained in a fluid medium such as air or water, and has for its object to provide improved means for sustaining and controlling movement of a craft.

More particularly it is an object of the invention to provide an enclosed column of air adapted for movement longitudinally through an aircraft for stabilizing its flight, and to direct a column of air upwardly against a suitable supporting surface in order to provide sustaining means for the craft, with the combined action of the longitudinally and vertically moving columns of air providing an angular relationship which will produce a lifting tendency.

It is a further object of the invention to provide means whereby the enclosed column of air which moves longitudinally through the aircraft may be controlled for imparting directional guidance and arresting the flight of the aircraft.

It is a still further object of the invention to provide for such disposition of the propeller mechanism and the cabin space as will insure maximum visibility from the pilot cabin and accommodation of passengers without exposure to blasts of air from the propellers.

Further objects of the invention will be readily understood from the following description of the accompanying drawings, in which:

Fig. 1 is a side elevation, partly in vertical section, of an aircraft embodying the invention.

Fig. 2 is a horizontal section through the same.

Fig. 3 is a front elevation of the aircraft, partly in transverse section.

Fig. 4 is a side elevation of a modified construction.

Fig. 5 is a plan view of this modification, partly in horizontal section.

Fig. 6 is a front elevation of this modification.

Fig. 7 is a side view of a still further modification.

Fig. 8 is a front elevation of the modification shown in Fig. 7.

In the various forms of the invention illustrated, an enclosed column of air moves longitudinally through an aircraft for stabilizing and imparting directional guidance thereto, and the means for sustaining the craft in its flight includes a column of air directed upwardly against a supporting surface so that the angular relation between the longitudinal and vertical air columns produces a lifting tendency.

In Fig. 1 the vertical air column is directed into a parachute type of supporting means, and in Fig. 4 it is directed upwardly against and thence rearwardly along longitudinally extending wing supporting surfaces, while in Fig. 7 it is directed against the outer ends of usual aeroplane wings so as to simply increase their usual sustaining force. In each case the longitudinal air column for stabilizing and controlling the aircraft is directed through a suitable passageway which opens through its body.

Referring particularly to Fig. 1, a nacelle 1 has the transversely spaced air tunnels 2 opening longitudinally therethrough, and the vertical air cloumn is obtained by means of a plurality of longitudinally spaced vertical air tunnels 3 positioned between the transversely spaced longitudinal tunnels 2. Columns of air are directed upwardly through tunnels 3 and into a supporting means which comprises a parachute structure 4 overlying the nacelle 1 and connected thereto by cables 5 so as to receive the columns of air and thereby support the craft. In order that the columns of air may continue upwardly and not simply be trapped in the parachute 4 so as to escape at the sides thereof, the parachute is preferably provided with a restricted central opening 6 through which the air is directed into and around an overlying baffle structure and thence into an auxiliary parachute. The baffle is shown as a smaller parachute 7 connected to the edges of parachute 4 by cables 8, and adapted when extended by the column of air directed upwardly through opening 6 to divert the air around the edge of this smaller parachute and thence into the auxiliary parachute 9 which preferably overlies the entire area of parachute 4 and is connected to the edges thereof by cables 10.

In the form of the invention illustrated in Fig. 4 a fuselage 1ª is preferably provided with a single longitudinally extending air tunnel 2ª and longitudinally extending wings 4ª are transversely spaced from the respective sides of the fuselage and form supporting surfaces against the undersides of the forward ends of which vertical columns of air are directed so that the air will move rearwardly along the undersides of the longitudinal wings and thus provide a sustaining means for the craft.

Fig. 7 shows the invention embodied in a typical aeroplane structure in which the fuselage 1ᵇ has a longitudinal air tunnel 2ᵇ and the usual wing structures 4ᵇ are adapted to sustain flight of the craft, with the sustaining force increased by columns of air directed upwardly against the undersides of the outer ends of the wings.

In each of the various forms of the invention, forward propulsion of the craft is obtained by a propeller 12 of the usual tractor type mounted in the forward end of each air tunnel 2—2ᵃ—2ᵇ and provided with usual motive force 13, and the columns of air directed upwardly against supporting means 4—4ᵃ—4ᵇ are generated by pusher propellers 14 which with their motors 15 are mounted in the lower ends of air tunnels 3 or are suitably supported beneath wings 4ᵃ or 4ᵇ.

Cabin space may be provided in the nacelle or fuselage of the aircraft alongside and beneath the air tunnels, and the pilot cabin 20 is preferably positioned at the front of the craft so that propeller 12, as a result of its being mounted in the longitudinal air tunnel, offers no obstruction to the view and maximum visibility is thus obtained; and the arrangement of propellers 12 and 14 as has been described permits the passenger cabins 21 being so positioned that their entrances 22 are not in the path of blasts of air generated by the propellers.

The tractor propellers 12 direct continuous columns of air rearwardly through the longitudinal air tunnels and since these tunnels are circumferentially enclosed the columns of air moving therethrough will exert an appreciable stabilizing effect, and by retarding or controlling the direction of these columns of air the aircraft may be arrested or accurately guided in its flight.

The means for directional guidance includes a tail plane or elevator 25 horizontally pivoted at the rear end of each longitudinal air tunnel as shown at 26, and vertical vanes controlling openings in the sides of the longitudinal tunnels adjacent their rear ends as shown in Fig. 2 or Fig. 5.

The tail plane 25 has a forward extension 27 adapted to close either an upwardly or a downwardly inclined outlet opening 28 which is provided at the rear end of the longitudinal air tunnel, and consequently by swinging the tail plane to the intermediate position shown in full lines in Fig. 1, so that the column of air in the longitudinal air tunnel escapes equally at both sides of the tail plane, the latter offers no directional guidance, but by swinging the tail plane to either of the dotted line positions shown in Fig. 1, its forward extension 27 closes one or the other of outlets 28 and thereby directs the column of air through the opposite opening and against the tail plane for elevating or depressing the nose of the craft.

When a plurality of longitudinal air tunnels are employed, the openings with which vertical vanes cooperate for lateral guidance are provided only in the outer side walls of the longitudinal tunnels as shown at 30 in Fig. 2, but when a single longitudinal air tunnel is used its opposite sides are provided with said lateral openings as shown at 30ᵃ in Fig. 5. Vertical vanes 31 are pivoted at the rear edges of these lateral openings as shown at 32, so as to close the openings as shown in full lines in Figs. 2 and 5, or the vane at one side or the other of the craft is adapted to be swung partially across the longitudinal air tunnel as shown in dotted lines, and thereby open its cooperating lateral outlet and direct a part of the column of air outwardly therethrough and along a rearward extension of the vane which is shown at 33, in order to swing the nose of the craft to the right or left for accurate lateral guidance. By swinging both of the vanes 31 shown in Fig. 5 to dotted line position with their forward ends abutting or by swinging both vanes shown in Fig. 2 to position extending all the way across tunnels 2, the column of air in the longitudinal air tunnel is equally laterally discharged at opposite sides of the aircraft and the contact of the column of air against the vanes provides a braking action for arresting flight of the craft.

The elevator 25 and the vanes 31 may be controlled from the pilot's cabin in usual manner, and since the particular construction of these controls forms no part of the present invention and may be of any desired or well known type, they are not herein shown nor described.

In order that the column of air in the longitudinal tunnel may be utilized as a sustaining force, the rear end of the longitudinal tunnel may be curved downwardly as shown in Fig. 7 so that the rearwardly moving column of air striking the upper side of the downwardly curved end of the tunnel will tend to lift the craft.

I have thus provided an aircraft in which an upwardly directed current of air strikes a suitable supporting medium and an enclosed column of air is directed longitudinally through the craft for stabilizing its flight with its discharge suitably controlled for directionally guiding and arresting the flight of the craft. The longitudinally and upwardly directed columns of air also cooperate to produce a lifting tendency as a result of their angular relation, and by controlling the longitudinal air column I insure an aircraft taking-off promptly, since by properly manipulating the elevator 25 the longitudinal column of air will tend to lift the tail end of the craft from the ground. The construction also permits of convenient arrangement of the cabin space of the craft so that the pilot cabin may be positioned for unobstructed vision and the passenger cabins may be so disposed as to permit access thereto without being subjected to blasts of air from the propellers.

I claim:

1. An aircraft having an air tunnel opening longitudinally therethrough, a propeller in said tunnel adapted to direct a column of air through said tunnel, the rear end of the tunnel having an upwardly and a downwardly inclined discharge opening, and a horizontally pivoted rearwardly projecting tail plane having a forward extension adapted to close the upwardly and downwardly inclined discharge opening respectively when the tail plane is depressed and elevated.

2. An aircraft having an air tunnel opening longitudinally therethrough, a propeller in said tunnel adapted to direct a column of air through said tunnel, the said tunnel having a lateral outlet, and a vertically pivoted upright vane adapted to close said lateral outlet or be swung into said tunnel so as to open said outlet and direct a part of the column of air outwardly therethrough.

3. A craft adapted to be sustained in a fluid medium and having a tunnel opening longitudinally therethrough, a propeller adapted to direct a column of the fluid through the tunnel, the rear end of the tunnel having an upwardly and a downwardly opening discharge port, and a horizontally pivoted rearwardly projecting fin having a forward extension adapted to close the upwardly and downwardly opening discharge port respectively when the fin is depressed and elevated.

4. A craft adapted to be sustained in a fluid medium and having a tunnel opening longitudinally therethrough, a propeller adapted to direct a column of the fluid through the tunnel, the rear end of the tunnel having an upwardly and a downwardly opening discharge port, a horizontally pivoted tail fin projecting rearwardly beyond the tunnel, and means actuated by movement of the tail fin for opening one and closing the other of the discharge ports.

5. A craft adapted to be sustained in a fluid medium and having a tunnel opening longitudinally therethrough, a propeller adapted to direct a column of the fluid through the tunnel, the rear end of the tunnel having an upwardly and a downwardly opening discharge port, a horizontally pivoted tail fin projecting rearwardly beyond the tunnel, and means actuated by movement of the tail fin for opening one and closing the other of the discharge ports and deflecting fluid in the tunnel outwardly through the open port.

6. A craft adapted to be sustained in a fluid medium and having a tunnel opening longitudinally therethrough, a propeller adapted to direct a column of the fluid through the tunnel, the rear end of the tunnel having a vertically opening discharge port, and a horizontally pivoted rearwardly projecting fin having a forward extension adapted to open or close the discharge part by opposite swinging of the fin.

7. A craft adapted to be sustained in a fluid medium and having a tunnel opening longitudinally therethrough, a propeller adapted to direct a column of the fluid through the tunnel, the rear end of the tunnel having a lateral outlet, and a vertically pivoted upright vane adapted to lie substantially parallel to the wall of the tunnel and close the lateral outlet or be swung into the tunnel so as to open the lateral outlet and direct fluid in the tunnel outwardly therethrough.

8. A craft adapted to be sustained in a fluid medium and having a tunnel opening longitudinally therethrough, a propeller adapted to direct a column of the fluid through the tunnel, the rear end of the tunnel having a lateral outlet, and means normally closing said outlet without obstructing longitudinal flow through the tunnel and adapted for movement to open the lateral outlet and deflect fluid in the tunnel outwardly therethrough.

9. A craft adapted to be sustained in a fluid medium and having a tunnel opening longitudinally therethrough, a propeller adapted to direct a column of the fluid through the tunnel, the rear end of the tunnel having opposite lateral outlets, and vertically pivoted upright vanes adapted to lie substantially parallel to the wall of the tunnel and close the respective lateral outlets or be swung into the tunnel so as to open the respective outlets and deflect fluid in the tunnel outwardly therethrough.

10. A craft adapted to be sustained in a fluid medium and having a tunnel opening longitudinally therethrough, a propeller adapted to direct a column of fluid through the tunnel, the rear end of the tunnel having a lateral outlet, and a vertically pivoted upright vane at the lateral outlet having a rearward projection outside the tunnel, the said vane being adapted to close the lateral outlet with its rearward projection extending longitudinally alongside the tunnel or adapted to be swung so as to open the lateral outlet with its rearward projection extending angularly outwardly from the tunnel.

11. A craft adapted to be sustained in a fluid medium and having a tunnel opening longitudinally therethrough, a propeller adapted to direct a column of fluid through the tunnel, the rear end of the tunnel having a lateral outlet, and a vertically pivoted upright vane at the lateral outlet having a rearward projection outside the tunnel, the said vane being adapted to close the lateral outlet with its rearward projection extending longitudinally alongside the tunnel or adapted to be swung so as to open the lateral outlet and deflect fluid in the tunnel outwardly therethrough with the rearward projection of the vane extending angularly outwardly from the tunnel.

12. A craft adapted to be sustained in a fluid medium and having a tunnel opening longitudinally therethrough, a propeller adapted to direct a column of the fluid through the tunnel, the rear end of the tunnel having opposite lateral outlets, and vertically pivoted upright vanes adapted to close the respective lateral outlets without obstructing longitudinal flow through the tunnel or be swung into the tunnel so as to open the respective outlets and cooperate for substantially closing the longitudinal opening through the tunnel and deflect fluid in the tunnel outwardly through the open outlets.

13. A craft adapted to be sustained in a fluid medium and having a tunnel for the fluid opening longitudinally therethrough, the rear end of the tunnel having transversely opposite discharge ports, and a rearwardly projecting pivoted fin having a forward extension adapted to close the respective ports by opposite swinging of the fin.

14. A craft adapted to be sustained in a fluid medium and having a tunnel for the fluid opening longitudinally therethrough, the rear end of the tunnel having an upwardly and a downwardly opening discharge port, a pivoted tail fin projecting rearwardly beyond the tunnel, and means actuated by movement of the tail fin for opening one and closing the other of the discharge ports.

15. A craft adapted to be sustained in a fluid medium and having a tunnel for the fluid opening longitudinally therethrough, the rear end of the tunnel having an upwardly and a downwardly opening discharge port, a pivoted tail fin projecting rearwardly beyond the tunnel, and means actuated by movement of the tail fin for opening one and closing the other of the discharge ports and deflecting fluid in the tunnel outwardly through the open port.

16. A craft adapted to be sustained in a fluid medium and having a tunnel for the fluid opening longitudinally therethrough, the rear end of the tunnel having a vertically opening discharge port, and a pivoted tail fin projecting rearwardly beyond the tunnel and adapted to open or close the port.

17. A craft adapted to be sustained in a fluid medium and having a tunnel for the fluid opening longitudinally therethrough, the rear end of the tunnel having an outlet at an angle to the longitudinal axis of the tunnel, and means normally closing said outlet without obstructing longitudinal flow through the tunnel and adapted for movement to open said outlet and deflect fluid in the tunnel outwardly therethrough.

18. A craft adapted to be sustained in a fluid medium and having a tunnel for the fluid opening longitudinally therethrough, the rear end of the tunnel having an outlet at any angle to the longitudinal axis of the tunnel, and a pivoted vane at the outlet having a rearward projection outside the tunnel, the said vane being adapted to close the outlet with its rearward projection extending longitudinally alongside the tunnel or adapted to be swung so as to open the outlet with its rearward projection extending angularly outwardly from the tunnel.

19. A craft adapted to be sustained in a fluid medium and having a tunnel for the fluid opening longitudinally therethrough, the rear end of the tunnel having transversely opposite outlets, and pivoted vanes adapted to close the respective outlets without obstructing longitudinal flow through the tunnel or be swung into the tunnel so as to open the respective outlets and cooperate for substantially closing the longitudinal opening through the tunnel and deflect fluid in the tunnel outwardly through the open outlets.

In testimony whereof he has affixed his signature to this specification.

ROY W. JAMES.